US012624939B2

(12) United States Patent
Heinemann et al.

(10) Patent No.: US 12,624,939 B2
(45) Date of Patent: May 12, 2026

(54) SENSING ELEMENT FOR AN INDUCTIVE ANGLE MEASURING DEVICE

(71) Applicant: DR. JOHANNES HEIDENHAIN GmbH, Traunreut (DE)

(72) Inventors: Christoph Heinemann, Übersee (DE); Martin Heumann, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 225 days.

(21) Appl. No.: 18/437,753

(22) Filed: Feb. 9, 2024

(65) Prior Publication Data

US 2024/0288259 A1    Aug. 29, 2024

(30) Foreign Application Priority Data

Feb. 23, 2023    (EP) .................................... 23158097

(51) Int. Cl.
G01B 7/30        (2006.01)
G01B 7/00        (2006.01)
(52) U.S. Cl.
CPC .............. G01B 7/30 (2013.01); G01B 7/003 (2013.01)
(58) Field of Classification Search
CPC ....... G01B 7/30; G01B 7/003; G01D 2205/40
See application file for complete search history.

(56) References Cited

U.S. PATENT DOCUMENTS

| | | | |
|---|---|---|---|
| 2002/0111728 A1* | 8/2002 | Nicot | G01L 3/101 |
| | | | 180/443 |
| 2006/0208727 A1* | 9/2006 | Matsumoto | G01D 5/145 |
| | | | 324/207.25 |
| 2011/0068777 A1* | 3/2011 | Tiemann | G01D 5/2457 |
| | | | 324/207.15 |

(Continued)

FOREIGN PATENT DOCUMENTS

| | | |
|---|---|---|
| DE | 102008017857 A1 | 10/2009 |
| EP | 3792599 A1 | 3/2021 |

(Continued)

OTHER PUBLICATIONS

European Search Report issued in EP Patent Application No. 23158097, dated Jul. 4, 2023, pp. 1-2.

*Primary Examiner* — Huy Q Phan
*Assistant Examiner* — Temilade S Rhodes-Vivour
(74) *Attorney, Agent, or Firm* — Carter, DeLuca & Farrell LLP

(57)        ABSTRACT

A sensing element for an inductive angle measuring device includes a first, a second, a third, and a fourth receiving conductive path. The second receiving conductive path extends over a second arc length, and the fourth receiving conductive path extends over a fourth arc length. The course of the first receiving conductive path and the third receiving conductive path is periodic along a first circular line. The course of the second receiving conductive path and the fourth receiving conductive path is periodic along a second circular line. The second receiving conductive path and the (Continued)

fourth receiving conductive path are arranged such that there is a first gap with a first gap length and a second gap with a second gap length between them in the circumferential direction. The first gap length and the second gap length are of different sizes, or the second arc length and the fourth arc length are of different sizes.

21 Claims, 4 Drawing Sheets

(56) References Cited

U.S. PATENT DOCUMENTS

| | | | | |
|---|---|---|---|---|
| 2014/0015520 | A1* | 1/2014 | Kunjappan | ............ G01D 5/145 |
| | | | | 324/207.21 |
| 2015/0137804 | A1* | 5/2015 | Yuan | ................. G01R 33/0011 |
| | | | | 216/22 |
| 2021/0080291 | A1* | 3/2021 | Ocket | ................. G01D 5/2073 |

FOREIGN PATENT DOCUMENTS

| | | |
|---|---|---|
| JP | 2006-322927 A | 11/2006 |
| WO | 2018/002568 A1 | 1/2018 |

* cited by examiner

SENSING ELEMENT FOR AN INDUCTIVE ANGLE MEASURING DEVICE

CROSS-REFERENCE TO RELATED APPLICATIONS

The present application claims priority to Application No. 23158097.8, filed in the European Patent Office on Feb. 23, 2023, which is expressly incorporated herein in its entirety by reference thereto.

FIELD OF THE INVENTION

The present invention relates to a sensing element for an inductive angle measuring device, e.g., for determining the position of a scale element relative to the sensing element.

BACKGROUND INFORMATION

Inductive position measuring devices are used, for example, as angle measuring devices to determine an angular position of machine parts that can be rotated relative to one another. In inductive position measuring devices, excitation tracks and receiving tracks, for example, in the form of conductive paths, are often applied to a common printed circuit board which usually has multiple layers and is firmly connected, for example, to a stator of the position measuring device. Opposite this printed circuit board is a scale element on which graduation structures are applied and which is firmly connected to a movable part of the position measuring device. When a time-varying electrical excitation current is applied to the excitation tracks, signals dependent on the position are generated in the receiving tracks during the relative movement between the scale element and the sensing element. These signals are further processed in an evaluation electronics system.

A sensing element for an inductive angle measuring device is described in and illustrated in FIG. 7 of PCT Patent Document No. WO 2018/002568. The sensing element device has several detector units that extend along a circular line in segments separated by gaps.

SUMMARY

Example embodiments of the present invention provide a comparatively accurately operating, compact, and inexpensively producible sensing element for an inductive angle measuring device.

According to example embodiments, the sensing element, which is intended and adapted for use in an inductive angle measuring device, has a first, second, third, and fourth detector unit. The first detector unit includes a first receiving conductive path extending over a first arc length. The second detector unit includes a second receiving conductive path, which extends over a second arc length. The third detector unit includes a third receiving conductive path extending over a third arc length. The fourth detector unit includes a fourth receiving conductive path, which extends over a fourth arc length. The curve of the first receiving conductive path and the curve of the third receiving conductive path are periodic in the circumferential direction along a first circular line, which has a first radius. The curve of the second receiving conductor path and the curve of the fourth receiving conductive path are also periodic in the circumferential direction along a second circular line, which has a second radius. The second and the fourth receiving conductive paths are arranged such that there is a first gap with a first gap length and a second gap with a second gap length between them in the circumferential direction. The first radius and the second radius are of different sizes. In addition, either a) the first gap length and the second gap length are of different sizes, or b) the second arc length and the fourth arc length are of different sizes.

In an angle measuring device, the sensing element is used to determine an angular position relative to a scale element, and the scale element is arranged rotatably around an axis relative to the sensing element, so that the measuring direction represents the circumferential direction with respect to the axis. The arc lengths and the gap lengths are measured in degrees and refer to a respective center angle around the axis or around the common center point of the concentrically arranged first and second circular lines. The detector units and, for example, the receiving conductive paths extend along the circumferential direction.

The second and fourth receiving conductive paths, e.g., those that generate in-phase signals, are analogously connected with each other to form sum signals. The same applies to the signals of the first and third receiving conductive paths.

For example, the second and fourth receiving conductive paths each have a periodic curve with a constant second period length $\lambda 2$.

The first gap length $\beta 24$ is a multiple m of the second period length $\lambda 2$ and the second gap length $\gamma 24$ is a multiple n of the second period length $\lambda 2$ ($\beta 24 = m \cdot \lambda 2$ and $\gamma 24 = n \cdot \lambda 2$, in which m and n are natural numbers greater than zero).

For example, the second period length $\lambda 2$ is an integer second divisor of 360°, and the second divisor is, for example, an odd number.

For example, the second arc length $\alpha 2$ and the fourth arc length $\alpha 4$ are multiples p, q of the second period length $\lambda 2$ ($\alpha 2 = p \cdot \lambda 2$ and $\alpha 4 = q \cdot \lambda 2$, in which p and q are natural numbers greater than zero).

For example, the first and the third receiving conductive paths are arranged such that there is a third gap with a third gap length and a fourth gap with the fourth gap length between them in the circumferential direction. The third gap length may be the same size as the fourth gap length.

For example, the first receiving conductive path extends over a first arc length and the third receiving conductive path over a third arc length. The first arc length is the same size as the third arc length.

For example, the first receiving conductive path and the third receiving conductive path have a periodic curve with a constant first period length $\lambda 1$, which is an integer first divisor of 360°, e.g., with regard to the first period length $\lambda 1$, the first divisor may be an even number. Accordingly, the first period length $\lambda 1$ divides the full circumference of 360° into an integer. 360° is therefore a multiple of the first period length $\lambda 1$.

For example, the first divisor and the second divisor are coprime. For the function of the sensing element, at least one of the period lengths $\lambda 1$, $\lambda 2$ divides the full circumference of 360° into an odd integer.

The first and second period lengths, like the arc lengths and the gap lengths, are measured in degrees and refer to a center angle around the axis or around the center point.

For example, the first gap length is smaller than the second gap length. Furthermore, the course of the second receiving conductor path has a first amplitude within a first section and a second amplitude within a second section. The first section extends over a first angle starting from the end of the second receiving conductive path adjacent to the first gap. The second section extends over a second angle starting from the other end of the second receiving conductive path adjacent to the second gap. The first angle is less than or equal to half the second arc length. In addition, the second angle is less than or equal to half the second arc length. Furthermore, the first amplitude is smaller than the second amplitude. The sensing element can also be configured such that the course of the second receiving conductive path has more than the two different amplitudes mentioned. For example, between the first section with the first amplitude and the second section with the second amplitude, there may be one or more sections in which the course of the second receiving conductive path has at least one further amplitude. The at least one further amplitude can have an intermediate magnitude, so that the transition along the curve of the second receiving conductive paths from the first amplitude to the second amplitude occurs in small increments.

For example, the course of the fourth receiving conductor path has a third amplitude within a third section and a fourth amplitude within a fourth section. The third section extends over a third angle starting from the end of the fourth receiving conductive path adjacent to the first gap. The fourth section extends over a fourth angle starting from the other end of the fourth receiving conductive path adjacent to the second gap. The third angle is less than or equal to half the fourth arc length. Likewise, the fourth angle is less than or equal to half the fourth arc length. Furthermore, the third amplitude is smaller than the fourth amplitude. Further amplitudes may be present in sections between the third amplitude and the fourth amplitude, each of which has an intermediate magnitude.

For example, the sensing element is configured so that the second arc length is the same size as the fourth arc length.

Alternatively, for example, the second arc length and the fourth arc length are of different sizes. The first and second gap lengths may be the same size. For example, a first area spanned between the second receiving conductive paths may be as large as the second area spanned by the fourth receiving conductive paths. For example, the course of the second receiving conductive path may have a first amplitude and the course of the fourth receiving conductive path may have a second amplitude. The first amplitude is, for example, smaller than the second amplitude, provided that the second arc length is greater than the fourth arc length.

Signals that can be generated by the first, second, third or fourth receiving conductive paths can be further processed with the aid of electronic components, which, for example, form an evaluation circuit. The sensing element includes a printed circuit board, and the electronic components are mounted on the printed circuit board. The electronic components can be elements of different electronic circuits or may be assigned to different circuits. For example, certain electronic components can be elements of the circuit for generating an excitation current, or further electronic components can be elements of a further circuit for evaluating or further processing signals.

According to example embodiments, an inductive angle measuring device includes the sensing element and a scale element.

Further features and aspects of example embodiments of the present invention are described in more detail below with reference to the appended schematic Figures.

DETAILED DESCRIPTION

Figure 1:
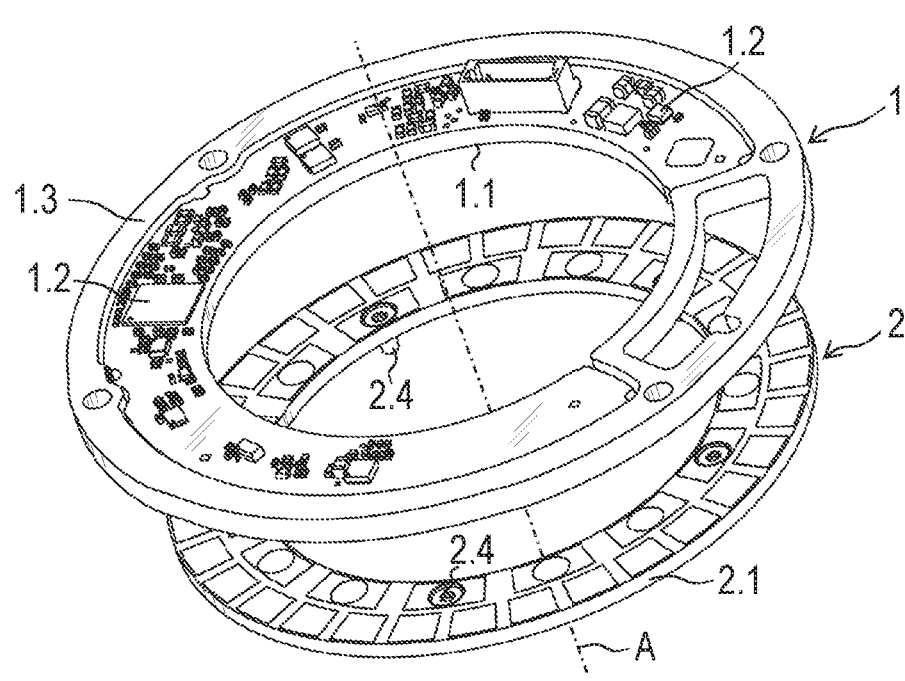
FIG. 1 is a perspective view of an angle measuring device that includes a sensing element and a scale element.

Referring, for example, to FIG. 1, an angle measuring device includes a sensing element 1, which can be used for capturing an angular position of a scale element 2. The scale element 2 is rotatably arranged about an axis A relative to the sensing element 1. Such an angle measuring device can be used, for example, in a drive device, in which the scale element 2 is rotationally fixed to a drive shaft of a motor, for example.

The sensing element 1 includes a printed circuit board 1.1, which has a plurality of layers, and electronic components 1.2, which are mounted on the printed circuit board 1.1. The printed circuit board 1.1 also includes a frame 1.3 as a mechanical supporting structure.

Figure 2:
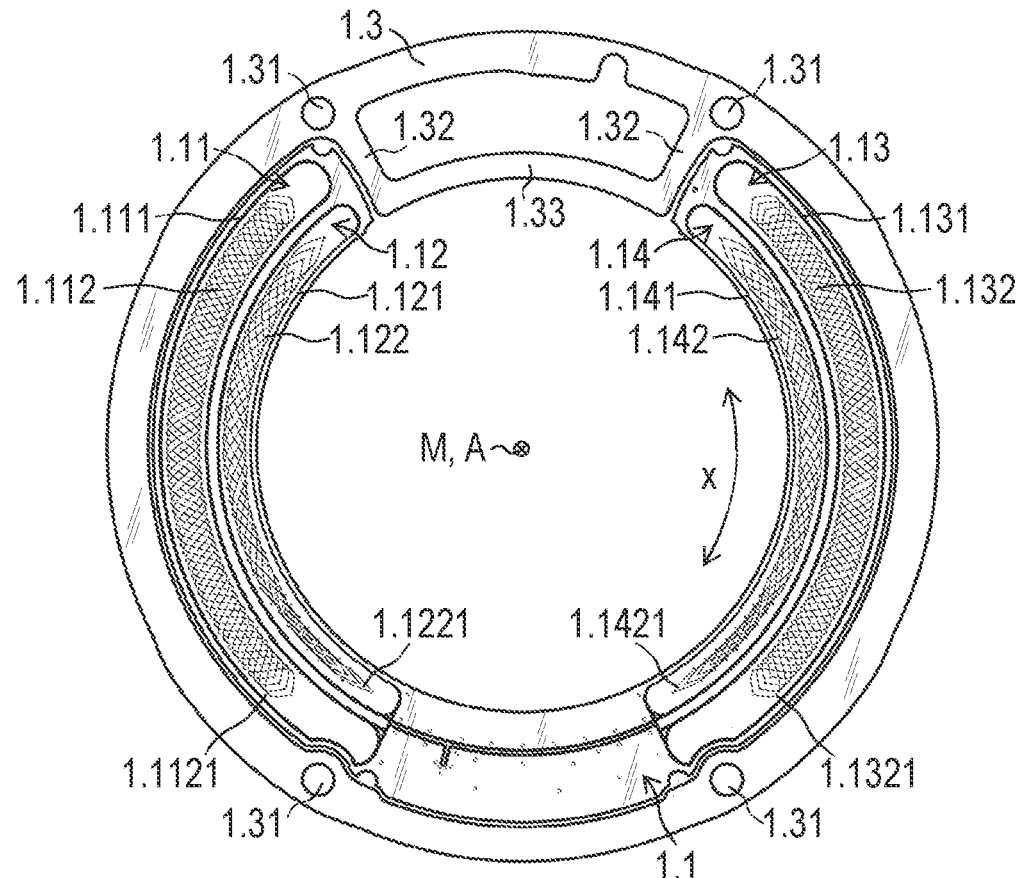
FIG. 2 is a top view of one side of the sensing element.

As also illustrated in FIG. 2, the printed circuit board 1.1 has the shape of a circular ring segment, which extends around approximately 300° and accordingly has an opening. The closed and substantially ring-shaped frame 1.3, e.g., made of metal, is fastened around the outside of the printed circuit board 1.1, mechanically reinforces the sensing element 1, and has fastening regions 1.31, e.g., in the form of bores. In the region of the opening of the printed circuit board 1.1, webs 1.32 of the frame 1.3 extend substantially in a radial direction parallel to the end faces of the printed circuit board 1.1. Another web 1.33 of the frame 1.3 extends over an angle of about 60° in a circular segment contour.

The sensing element 1 is used to sense the first scale element 2. Foe example, the electronic components 1.2 are only mounted on one side of the printed circuit board 1.1, e.g., on the side facing away from the scale element 2. Alternatively or additionally, it is also possible to provide the other side of the printed circuit board 1.1 with electronic components 1.2.

To determine the angular information, the printed circuit board 1.1 has a first detector unit 1.11, a second detector unit 1.12, a third detector unit 1.13, and a fourth detector unit 1.14, as illustrated in FIG. 2. The detector units 1.11 to 1.14 have a ring-segment-like shape, and the center point M of the ring-segment-like shape is located on the axis A. Accordingly, the detector units 1.11 to 1.14 are arranged, in a first approximation, concentrically opposite each other with respect to the center point M.

The first detector unit 1.11 includes a first excitation track 1.111 and a first receiving track 1.112. Similarly, the second detector unit 1.12 includes a second excitation track 1.121 and a second receiving track 1.122, the third detector unit 1.13 includes a third excitation track 1.131 and a third receiving track 1.132, and the fourth detector unit 1.14 includes a fourth excitation track 1.141 and a fourth receiving track 1.142.

The excitation tracks 1.111, 1.121, 1.131, 1.141 enclose a respective one of the receiving tracks 1.112, 1.122, 1.132, 1.142. Both the excitation tracks 1.111, 1.121, 1.131, 1.141 and the receiving tracks 1.112, 1.122, 1.132, 1.142 extend along a circumferential direction x.

For example, each of the receiving tracks 1.112, 1.122, 1.132, 1.142 includes four receiving conductive paths 1.1121, 1.1221, 1.1321, 1.1421, respectively, which are arranged offset in the circumferential direction x, so that they can provide four phase-shifted signals in accordance with the offset. For example, within a receiving track 1.112, 1.122, 1.132, 1.142, adjacent receiving conductive paths 1.1121, 1.1221, 1.1321, 1.1421 are arranged offset from one another by ⅛ of the full sine period (by π/4 or 45° along the circumferential direction x).

The receiving conductive paths 1.1121, 1.1221, 1.1321, 1.1421 which belong to one and the same receiving track 1.112, 1.122, 1.132, 1.142 are indicated with only one reference numeral. Thus, for example, all receiving conductive paths 1.1121 of the first receiving track 1.112 are indicated by only one reference numeral. In addition, the first receiving conductive paths 1.1121, 1.1221, 1.1321, 1.1421 of the detector units 1.11 to 1.14 are connected by vias and are arranged in different layers of the printed circuit board 1.1, so that undesirable short circuits are avoided at crossing points. Although, strictly speaking, each of the receiving conductive paths 1.1121, 1.1221, 1.1321, 1.1421 includes many conducting pieces, each of which is distributed and strung together on two planes or layers, in the following description, such a structure is collectively referred to as a receiving conductive path 1.1121, 1.1221, 1.1321, 1.1421.

Figure 3:
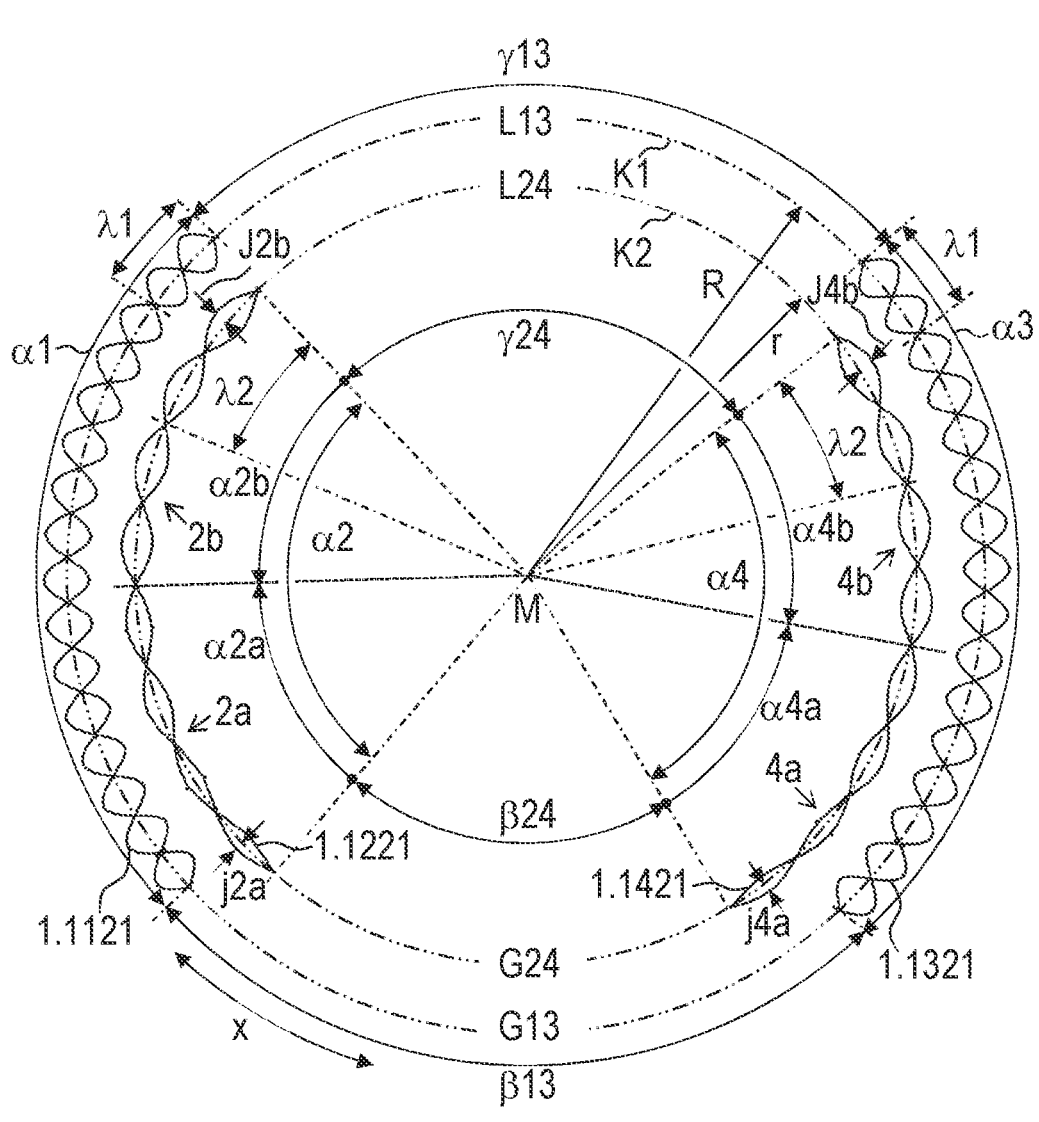
FIG. 3 is a top view of the sensing element.

For clarity, only one receiving conductive path 1.1121, 1.1221, 1.1321, 1.1421 of the receiving tracks 1.112, 1.122, 1.132, 1.142 is illustrated in FIG. 3. The following explanations are based on this representation of a single receiving conductive path 1.1121, 1.1221, 1.1321, 1.1421, and the conditions also apply to the phase-shifted receiving conductive paths 1.1121, 1.1221, 1.1321, 1.1421 respectively belonging to each other.

The first receiving conductive path 1.1121 and the third receiving conductive path 1.1321 extend along a first circular line K1, which has a first radius R. The second receiving conductive path 1.1221 and the fourth receiving conductive path 1.1421 extend along a second circular line K2, which has a second radius r; the second radius r is smaller than the first radius R, so that the following relationship is satisfied:

$$r < R$$

Both circular lines K1, K2 have the same center point M. The receiving conductive paths 1.1121, 1.1221, 1.1321, 1.1421 have a spatially periodic curve that is substantially sine-shaped or sinusoidal. The first receiving conductive paths 1.1121 of the first receiving track 1.112 and the third receiving conductive paths 1.1321 of the third receiving track 1.132 have a constant first period length λ1 throughout their curve. In contrast, the second receiving conductive paths 1.1221 of the second receiving track 1.122 and the fourth receiving conductive paths 1.1421 of the fourth receiving track 1.142 have a constant second period length λ2 throughout their curve. For example, the second period length λ2 is larger than the first period length λ1, i.e.:

$$\lambda2 > \lambda1$$

The period lengths λ1, λ2 are expressed in degrees and refer to a respective center angle around the axis A or around the center point M. For example, the first period length λ1 is 360°/32, i.e., 11.25°, the second period length λ2 is 360°/15, i.e., 24°.

Thus, the first period length λ1 is an integer first divisor S of 360°, in which S=32 and S∈ℕ.

Analogously, the second period length λ2 is an integer second divisor T of 360°, in which T=15 and T∈ℕ.

The first divisor S and the second divisor T are coprime, i.e., S⊥T.

The second receiving conductive paths 1.1221 and the fourth receiving conductive paths 1.1421 are arranged such that there is a first gap G24 and a second gap L24 between them in the circumferential direction x. The second receiving conductive paths 1.1221 extend over a second arc length α2 and the fourth receiving conductive paths 1.1421 extend over a fourth arc length α4, in which the following relationships are satisfied in the illustrated example embodiment:

$$\alpha2 = p \cdot \lambda2$$

$$\alpha4 = q \cdot \lambda2$$

$$\alpha2 = \alpha4, \text{ since } p = q \text{ and } p, q \in \mathbb{N}$$

For example, p=q=4, thus α2=4×24°=96°=α4. Consequently, the second receiving conductive paths 1.1221 and the fourth receiving conductive paths 1.1421 extend over an equal arc length α2, α4, which corresponds to four second period lengths λ2.

The first gap G24 extends over a first gap length β24 and the second gap L24 extends over a second gap length γ24. The first gap length β24 is a first multiple m of the second period length λ2, in which m=3. In addition, the second gap length γ24 is a second multiple n; in the illustrated example embodiment, n=4. For example, natural numbers greater than zero can be used for m and n. The following relationships are satisfied:

$$\beta24 = m \cdot \lambda2$$

$$\gamma24 = n \cdot \lambda2$$

$$m \neq n \text{ and } m, n \in \mathbb{N}$$

In addition, the sum of m and n is an odd number, i.e., m+n=2·k+1, in which k∈ℕ.

With regard to the forming of an absolute angle measurement value, e.g., for forming a connection or a link with the first and third receiving tracks 1.112, 1.132, the sum of the second arc length α2, the fourth arc length α4, the first gap length 324, and the second gap length γ24 may be an odd multiple of the second period length λ2, or the second divisor T (e.g., 15) is an odd number. For example, the following relationships are satisfied:

$$\alpha2 + \alpha4 + \beta24 + Y24 = (2 \cdot k + 1) \cdot \lambda2$$

or $$p + q + m + n = 2 \cdot k + 1, \text{ i.e.,}$$

$$4 + 4 + 4 + 3 = 15(= 2 \cdot 7 + 1)$$

For example, the second receiving conductive paths 1.1221 and the fourth receiving conductive paths 1.1421 respectively extend over an equal arc length α2, α4 (p=q). Consequently, the first gap length β24 and the second gap length γ24 are different sizes, provided that the arc lengths α2, α4 and the gap lengths β24, γ24 are respectively a multiple of the second period length λ2 and their sum is an odd multiple of the second period length $\lambda 2$. For example, the first gap length $\beta 24$ is smaller than the second gap length $\gamma 24$, so that the following relationships are satisfied:

$$\beta 24 < \Upsilon 24$$

or $$m < n$$

For example, the difference between the first gap length $\beta 24$ and the second gap length $\gamma 24$ is minimal, so that the following relationships are satisfied:

$$n - m = 1,$$

or $$\gamma 24 - \beta 24 = \lambda 2$$

The first receiving conductive paths 1.1121 and the third receiving conductive paths 1.1321 are arranged such that there is a third gap G13 and a fourth gap L13 between them in the circumferential direction x. In addition, the first receiving conductive paths 1.1121 extend over a first arc length $\alpha 1$, in which $\alpha 1 = s \cdot \lambda 1$.

The third receiving conductive paths 1.1321 extend over a third arc length $\alpha 3$, in which the following relationships are satisfied:

$$\alpha 3 = t \cdot \lambda 1$$

$$s = t$$

$$s, t \in \mathbb{N}$$

For example, s=t=8, so that $\alpha 1 = 8 \times 11.25° = 90° = \alpha 3$. The first receiving conductive paths 1.1121 and the third receiving conductive paths 1.1321 thus respectively extend over an equal arc length $\alpha 1$, $\alpha 3$, which corresponds to eight first period lengths $\lambda 1$.

The third gap G13 extends over a third gap length $\beta 13$ and the fourth gap L13 extends over a fourth gap length $\gamma 13$. The third gap length $\beta 13$ is a third multiple v of the first period length $\lambda 1$. In addition, the fourth gap length $\gamma 13$ is a fourth multiple w; for example, v and w equal 8. For example, natural numbers greater than zero can be used for v and w. The following relationships are satisfied:

$$\beta 13 = v \cdot \lambda 1$$

$$\gamma 13 = w \cdot \lambda 1$$

$$v = w,$$

$$v, w \in \mathbb{N}$$

Furthermore, in the illustrated example embodiment, v and w are an even number. To form an absolute angle measurement value, the sum of the first arc length $\alpha 1$, the third arc length $\alpha 3$, the third gap length $\beta 13$, and the fourth gap length $\gamma 13$ is an even multiple of the first period length $\lambda 1$, or the first divisor S (e.g., 32) is an even number. The following relationships are satisfied:

$$\alpha 1 + \alpha 3 + \beta 13 + \gamma 13 = (2 \cdot k) \cdot \lambda 2$$

or $$s + t + v + w = 2 \cdot k, \text{ i.e.,}$$

$$8 + 8 + 8 + 8 = 32( = 2 \cdot 16)$$

$$k \in \mathbb{N}$$

The third gap G13 and the fourth gap L13 extend over a multiple of the first period length $\lambda 1$. In addition, the third gap G13 and the fourth gap L13 are of equal size, so that the third gap G13 extends over 90° or eight first period lengths $\lambda 1$ and the fourth gap L13 also extends over 90°.

The course of the second receiving conductive paths 1.1221 has different amplitudes j2a, J2b along the circumferential direction x. There are therefore different distances between the second circular line K2 and the sinusoidally extending second receiving conductive path 1.1221 in the region of maximum deflection. For example, the course of the second receiving conductive paths 1.1221 has the first amplitude j2a within a first section 2a, in which the first section 2a extends over a first angle $\alpha 2a$ starting from the end of the second receiving conductive path 1.1221 adjacent to the first gap G24. Within a second section 2b, the course of the second receiving conductive paths 1.1221 has a second amplitude J2b, in which the second section 2b extends over a second angle $\alpha 2b$ starting from the other end of the second receiving conductive path 1.1221 adjacent to the second gap L24. The first and second angles $\alpha 2a$, $\alpha 2b$ are less than or equal to half the second arc length $\alpha 2$. The first amplitude j2a is smaller than the second amplitude J2b.

An analogous consideration is also true for the fourth receiving conductive paths 1.1421. Accordingly, the course of the fourth receiving conductive paths 1.1421 has different amplitudes j4a, J4b along the circumferential direction x. There are therefore different distances between the second circular line K2 and the sinusoidally extending fourth receiving conductive paths 1.1421 in the region of maximum deflection. For example, the course of the fourth receiving conductive paths 1.1421 has the third amplitude j4a within a third section 4a, in which the third section 4a extends over a first angle $\alpha 4a$ starting from the end of the fourth receiving conductive path 1.1421 adjacent to the first gap G24. Within a fourth section 4b, the course of the fourth receiving conductive paths 1.1421 has a fourth amplitude J4b, in which the fourth section 4b extends over a fourth angle $\alpha 4b$ starting from the other end of the fourth receiving conductive path 1.1421 adjacent to the second gap L24. The first and fourth angles $\alpha 4a$, $\alpha 4b$ are less than or equal to half the fourth arc length $\alpha 4$, and the third amplitude j4a is smaller than the fourth amplitude J4b. Accordingly, the following relationships are satisfied in the illustrated example embodiment:

j2a=j4a

J2b=J4b

In the illustrated example embodiment, the second and fourth receiving conductive paths 1.1221, 1.1421 not only have two different amplitudes j4a, J4b. In the regions between the two aforementioned amplitudes j4a, J4b, there are $\lambda 2$ amplitudes within the respective second period length, which have an intermediate magnitude, i.e., are smaller than the second amplitude J2b or fourth amplitude J4b and larger than the first amplitude j2a or third amplitude j4a.

For example, the area spanned between the second receiving conductive paths 1.1221, i.e., the sum of the individual areas between the sinusoidal second receiving conductive paths 1.1221 (sum of all lenticular partial areas), is similar or the same size as the area spanned by the fourth receiving conductive paths 1.1421.

The receiving conductive paths 1.1121, 1.1221, 1.1321, 1.1421 are electrically connected such that they provide 0° and 90° signals on the one hand and 45° and 135° signals on the other hand. A first position signal can be determined from the 0° and 90° signals, and a second position signal redundant with respect to the first position signal can be determined from the 45° and 135° signals. In addition, the first receiving conductive paths 1.1121 of the first receiving track 1.112 and the third receiving conductive paths 1.1321 of the third receiving track 1.132 are connected analogously in series with each other. Similarly, the second receiving conductive paths 1.1221 of the second receiving track 1.122 and the fourth receiving conductive paths 1.1421 of the fourth receiving track 1.142 are connected analogously in series with each other. The signals generated by the interconnected receiving conductive paths 1.1121, 1.1221, 1.1321, 1.1421 are evaluated via a common evaluation ASIC, so that an absolute position is calculated in this manner.

Figure 4:
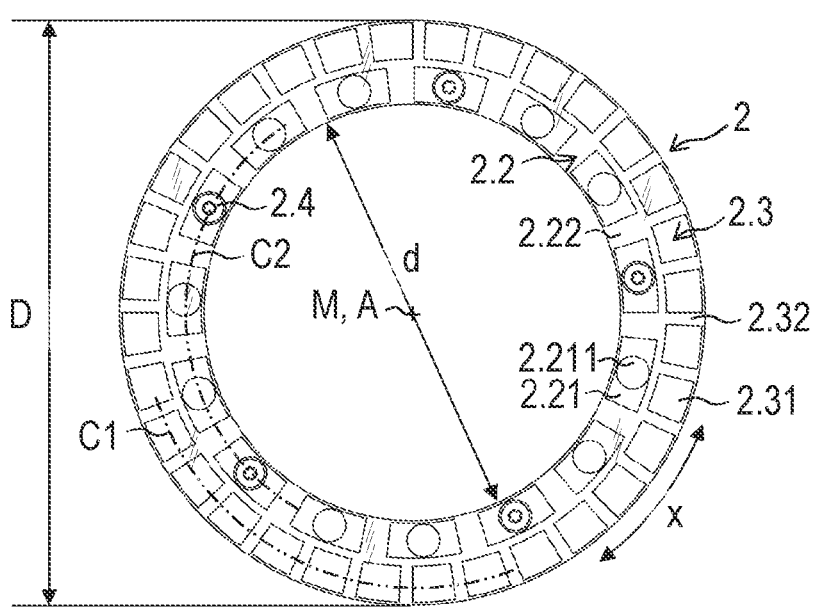
FIG. 4 is a top view of one side of a scale element.

FIG. 4 is a top view of the scale element 2. The scale element 2 has an annular or circular shape with an inner diameter d and an outer diameter D. For example, the inner diameter d is relatively large, so that D/d=1.4, for example.

Figure 5:
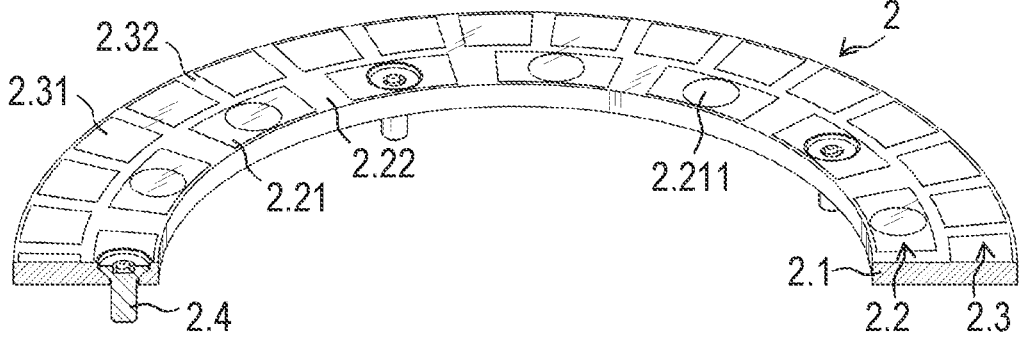
FIG. 5 is a perspective cross-sectional view of the scale element.

The scale element 2 includes a substrate 2.1 (see, e.g., FIG. 5), e.g., produced from epoxy resin and on which two graduation tracks 2.2, 2.3 are arranged. The graduation tracks 2.2, 2.3 are formed in the shape of a ring and are arranged on the substrate 2.1, concentrically with respect to the axis A with different radii, so that the first graduation track 2.2 extends along the second graduation circle line C2 and the second graduation track 2.3 extends along the first graduation circle line C1. The graduation tracks 2.2, 2.3 include graduation structures including a periodic sequence of electrically conductive graduation regions 2.21, 2.31 and electrically non-conductive graduation regions 2.22, 2.32 arranged alternately along the circumferential direction x, and the electrically conductive graduation regions 2.21, 2.31 are formed from a layer of electrically conductive material. For example, copper is applied to the substrate 2.1 as the material for the electrically conductive graduation regions 2.21, 2.31. In the non-conductive graduation regions 2.22, 2.32, on the other hand, the substrate 2.1 is not coated.

With the arrangement including two graduation tracks 2.2, 2.3, the angular position of the scale element 2 can be determined absolutely. The outer graduation track 2.3 of the scale element 2 has the greater number of respective graduation regions 2.31, 2.32 along the circumferential direction x, so that through these the greater resolution with respect to the measurement of the angular position can be achieved. For example, the second (outer) graduation track 2.3 has an even multiple of the first period length λ1, namely 32, corresponding to the sum s+t+v+w on which the geometry of the first and third receiving conductive paths 1.1121, 1.1321 is based. In contrast, the first (inner) graduation track 2.2 has the smaller number of graduation regions 2.31, 2.32 along the circumferential direction x, e.g., 15. This corresponds to the sum p+q+m+n, which is decisive for the configuration of the second receiving conductive paths 1.1221 and fourth receiving conductive paths 1.1421.

The electrically conductive graduation regions 2.21 of the first (inner) graduation track 2.2 have an opening 2.211, so that the layer of electrically conductive material is open at this point or the substrate 2.1 is not coated in this region. The electrically conductive graduation regions 2.21 are configured or arranged such that the opening 2.211 is enclosed by the electrically conductive graduation region 2.21. The openings 2.211 are arranged such that they have the same distance from the center point M and are arranged equidistantly along the second graduation circle line C2 in the circumferential direction x (e.g., a distance of 24°). The electrically conductive material encloses the opening 2.211, so that there are webs 2.212 (see, e.g., FIG. 6) made of electrically conductive material on both sides around the opening 2.211 and there is a closed contour made of electrically conductive material around the opening 2.211.

In a partial number, e.g., five, of the electrically conductive graduation regions 2.21, bores 2.11 are arranged in the substrate 2.1 through an opening 2.211. The bores 2.11 are thus arranged along the first (inner) graduation track 2.2 or along the second graduation circle line C2 in the substrate 2.1. For example, five bores 2.11 are provided, which have the same distance from the center point M and are arranged equidistantly (e.g., a distance of 72°) along the second graduation circle line C2.

Figure 6:
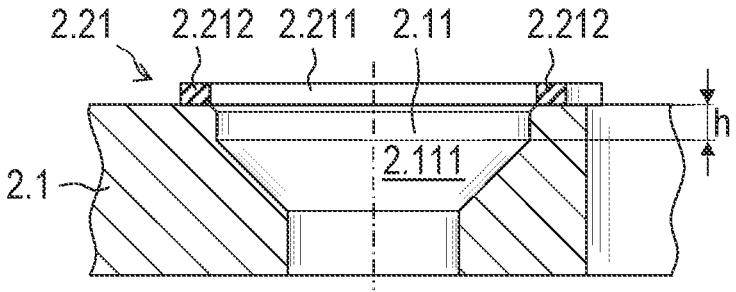
FIG. 6 is a cross-sectional view through a bore of the scale element.

FIG. 6 is an enlarged cross-sectional view through a part of the scale element 2 in the region of the first graduation track 2.2. In FIG. 6, the thickness of the layer of electrically conductive material of the electrically conductive graduation region 2.21 is illustrated exaggeratedly large for illustration purposes. The bore 2.11 is arranged as a stepped through bore. For example, the bore 2.11 has a conical region 2.111, which is produced, for example, by countersinking. The conical region 2.111 is arranged recessed by a dimension h with respect to the surface of the substrate 2.1 or in the axial direction. As a result, a fastening element 2.4, e.g., a screw, a countersunk screw head, etc., can be arranged in the bore 2.11. The fastening element 2.4 is recessed with respect to the surface of the substrate 2.1 and with respect to the surface of the electrically conductive graduation region 2.21. The fastening element 2.4 is used to fasten the scale element 2 to a machine part and is, for example, made of steel and is therefore electrically conductive.

In the assembled state, the sensing element 1 and the scale element 2 are opposite one another with an axial distance or an air gap, so that when there is a relative rotation between the scale element 2 and the sensing element 1 a signal depending on the respective angular position can be generated in each of the receiving conductive paths 1.1121, 1.1221, 1.1321, 1.1421 by induction effects. A prerequisite for the formation of corresponding signals is that the excitation tracks 1.111, 1.121, 1.131, 1.141 generate a time-varying electromagnetic excitation field in the region of the respective sensed graduation structures. For example, the excitation tracks 1.111, 1.121, 1.131, 1.141 are arranged as a plurality of planar-parallel current-carrying individual conductive paths. The sensing element 1 has an electronic circuit with the electronic components 1.2, which are electrically connected to each other. The electronic circuit can also include an ASIC component. The signals generated by the receiving tracks 1.112, 1.122, 1.132, 1.142 are further processed by some of the electronic components 1.2 which form an evaluation circuit. This electronic circuit of the sensing element 1 operates not only as an evaluation element, but also as an excitation control element under whose control the excitation current is generated or produced, which flows through the excitation tracks 1.111, 1.121,

1.131, 1.141. Thus, the excitation tracks 1.111, 1.121, 1.131, 1.141 are supplied with current by one and the same excitation control element.

If the excitation tracks 1.111, 1.121, 1.131, 1.141 are energized, a tubularly or cylindrically oriented electromagnetic field is formed around the excitation tracks 1.111, 1.121, 1.131, 1.141. The field lines of the resulting electromagnetic field extend around the excitation tracks 1.111, 1.121, 1.131, 1.141, and the direction of the field lines depends on the direction of the current in the excitation tracks 1.111, 1.121, 1.131, 1.141. Eddy currents are induced in the region of the electrically conductive graduation regions 2.21, 2.31, so that a modulation of the field is achieved which is dependent on the angular position. Accordingly, through the receiving tracks 1.112, 1.122, 1.132, 1.142, the relative angular position can be measured. The arrangement of the first electrically conductive graduation regions 2.21, e.g., the positioning and dimensioning of the openings 2.211, provides for a suitable formation of the eddy currents, which can flow around the opening 2.211 over 360°, e.g., in the webs 2.212 made of electrically conductive material. This allows for a comparatively compact configuration of the scale element 2 to be achieved without noticeably reducing the measuring accuracy. This is due to the fact that although the fastening elements 2.4 are integrated in the first graduation track 2.2, they do not affect the measurement result. For example, the electrically conductive graduation regions 2.21 which do not have a bore have the same opening 2.211 as the graduation regions 2.21 with the bores 2.11 and with the fastening elements 2.4. Additionally, the fastening elements 2.4 may be recessed in the axial direction.

Figure 7:
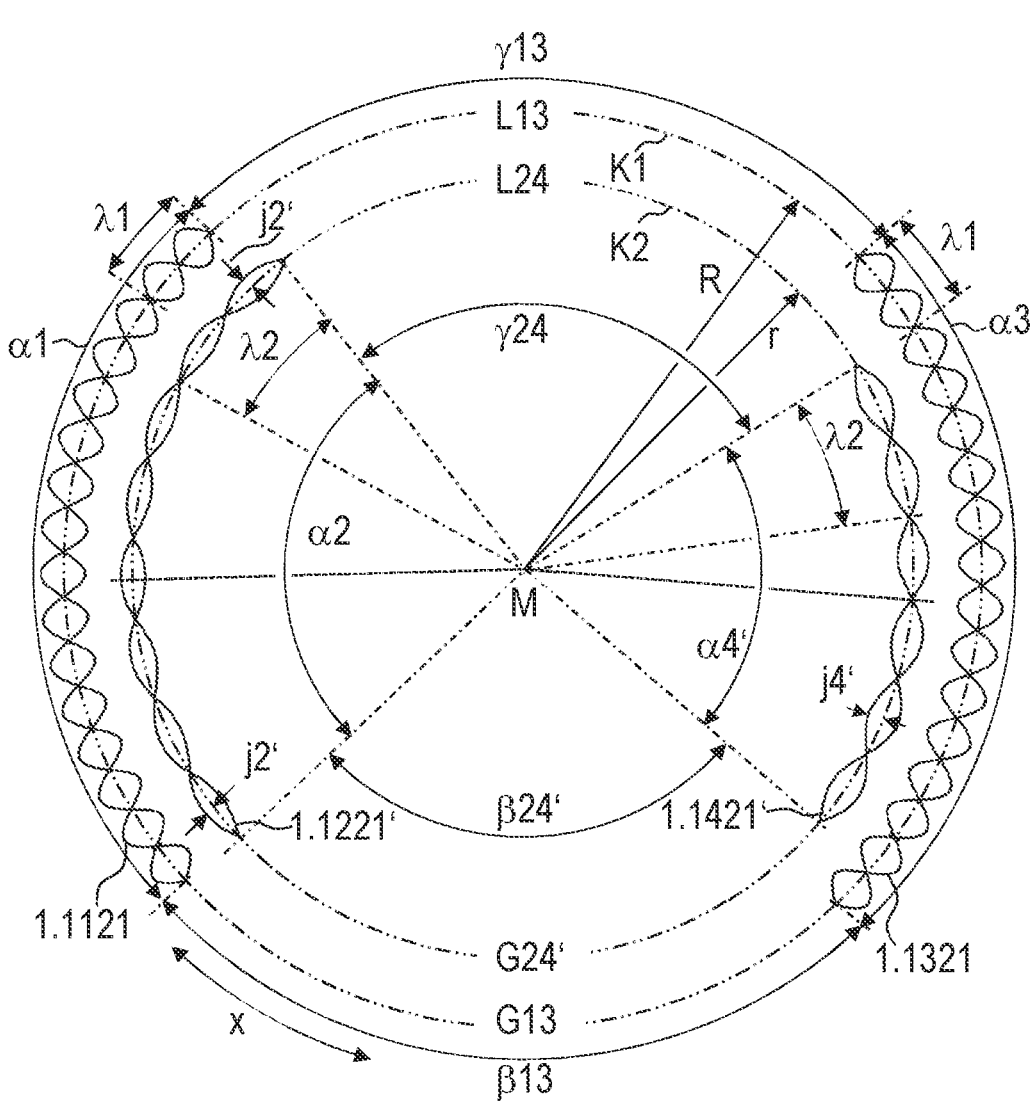
FIG. 7 is a top view of the sensing element.

FIG. 7 illustrates a sensing element 1 having a different arrangement of the second and fourth detector units 1.12, 1.14. For example, the second receiving conductive paths 1.1221 extend over a second arc length $\alpha 2$ and the fourth receiving conductive paths 1.1421 extend over a fourth arc length $\alpha 4'$, in which the following relationships are satisfied:

$$\alpha 2 = p \cdot \lambda 2$$
$$\alpha 4' = q' \cdot \lambda 2$$
$$p \neq q'$$
$$p, q' \in \mathbb{N}$$

For example, p=4 and q'=3; thus $\alpha 2 = 4 \times 24° = 96°$ and $\alpha 4' = 3 \times 24° = 72°$. Thus the following relationship is satisfied:

$$\alpha 2 > \alpha 4'$$

The first gap G24' extends over a first gap length 324', and the second gap L24 extends over a second gap length $\gamma 24$. The first gap length $\beta 24'$ is a first multiple m' of the second period length $\lambda 2$, in which m'=4. In addition, the second gap length $\gamma 24$ is a second multiple n; for example, n=4. For example, natural numbers greater than zero can be used for m' and n, and the following relationships are satisfied:

$$\beta 24' = m' \cdot \lambda 2$$
$$\gamma 24 = n \cdot \lambda 2$$
$$m' = n,$$
$$m', n \in \mathbb{N}$$

With regard to forming an absolute angle measurement value, the sum of the second arc length $\alpha 2$, the fourth arc length $\alpha 4'$, the first gap length $\beta 24'$, and the second gap length $\gamma 24$ is an odd multiple of the second period length 2 (e.g., 15). For example, the following relationships are satisfied:

$$\alpha 2 + \alpha 4' + \beta 24' + \gamma 24 = (2 \cdot k + 1) \cdot \lambda 2$$
or
$$p + q' + m' + n = 2 \cdot k + 1, \text{ i.e.,}$$
$$4 + 3 + 4 + 4 = 15( = 2 \cdot 7 + 1)$$

For example, the first gap length $\beta 24'$ is equal to the second gap length $\gamma 24$, so that the following relationship is satisfied:

$$\beta 24' = \gamma 24$$

For example, the difference between the second arc length $\alpha 2$ and the fourth arc length $\alpha 4'$ is minimal, so that the following relationships are satisfied:

$$p - q' = 1,$$
or
$$\alpha 2 - \alpha 4' = \lambda 2$$

The course of the second receiving conductive paths 1.1221' has equal amplitudes j2' along the circumferential direction x. There are therefore equal distances between the second circular line K2 and the sinusoidally extending second receiving conductive path 1.1221' along the circumferential direction x respectively in the region of maximum deflection.

An analogous consideration is also true for the fourth receiving conductive paths 1.1421'. Accordingly, the course of the fourth receiving conductive paths 1.1421' has equal amplitudes j4' along the circumferential direction x. However, the following relationship is satisfied in the arrangement illustrated in FIG. 7:

$$j2' \neq j4'$$

For example, for $\alpha 2 > \alpha 4'$ the following relationship is satisfied:

$$j2' < j4'$$

For example, the area spanned between the second receiving conductive paths 1.1221' (sum of all lenticular partial areas) is similar or the same size as the area spanned by the fourth receiving conductive paths 1.1421'. In the arrangement illustrated in FIG. 7, the second receiving conductive paths 1.1221' extend over four second period lengths λ2 and the fourth receiving conductive paths 1.1421' extend over only three second period lengths λ2. For compensation, the amplitude j2' of the second receiving conductive paths 1.1221' is smaller than the amplitude j4' of the fourth receiving conductive paths 1.1421', so that the total area spanned by the second receiving conductive paths 1.1221' is approximately the same as the total area spanned by the fourth receiving conductive paths 1.1421'.

What is claimed is:

1. A sensing element for an inductive angle measuring device, comprising:

a first detector unit including a first receiving conductive path;

a second detector unit including a second receiving conductive path that extends over a second arc length;

a third detector unit including a third receiving conductor path; and a fourth detector unit including a fourth receiving conductor path that extends over a fourth arc length;

wherein a course of the first receiving conductive path and of the third receiving conductive path is periodic along a first circular line having a first radius;

wherein a course of the second receiving conductive path and of the fourth receiving conductive path is periodic along a second circular line having a second radius;

wherein a first gap having a first gap length and a second gap having a second gap length are arranged between the second receiving conductive path and the fourth receiving conductive path in a circumferential direction;

wherein the first radius and the second radius are different; and wherein the first gap length and the second gap length are of different sizes or the second arc length and the fourth arc length are of different sizes.

2. The sensing element according to claim 1, wherein each of the second receiving conductive path and the fourth receiving conductive path has a periodic course with a constant second period length, the first gap length is a first multiple of the second period length, the second gap length is a second multiple of the second period length, the following relationships being satisfied:

$$\beta24 = m \cdot \lambda2$$

$$\text{and}$$

$$\gamma24 = n \cdot \lambda2,$$

β24 representing the first gap length, γ24 representing the second gap length, λ2 representing the second period length, m representing the first multiple, n representing the second multiple, m and n being natural numbers greater than zero.

3. The sensing element according to claim 1, wherein the course of each of the second receiving conductive path and the fourth receiving conductive path is periodic with a constant second period length, the second period length being a second divisor of 360°.

4. The sensing element according to claim 3, wherein the second divisor is an odd number.

5. The sensing element according claim 1, wherein each of the second receiving conductive path and the fourth receiving conductive path has a periodic course with a constant second period length, the second arc length is a first multiple of the second period length, the fourth arc length is a second multiple of the second period length, the following relationships being satisfied:

$$\alpha2 = p \cdot \lambda2$$

$$\text{and}$$

$$\alpha4 = q \cdot \lambda2,$$

α2 representing the second arc length, α4 representing the fourth arc length, λ2 representing the second period length, p representing the first multiple, q representing the second multiple, p and q being natural numbers greater than zero.

6. The sensing element according to claim 1, wherein a third gap having a third gap length and a fourth gap having a fourth gap length are arranged between the first receiving conductive path and the third receiving conductive path in the circumferential direction.

7. The sensing element according to claim 6, wherein the third gap length and the fourth gap length are equal.

8. The sensing element according to claim 6, wherein the first receiving conductive path extends over a first arc length, the third receiving conductive path extends over a third arc length, and the first arc length and the third arc length are equal.

9. The sensing element according to claim 1, wherein the course of each of the first receiving conductive path and the third receiving conductive path is periodic having a constant first period length that is a first divisor of 360°.

10. The sensing element according to claim 9, wherein the first divisor is an even number.

11. The sensing element according to claim 9, wherein the course of each of the second receiving conductive path and the fourth receiving conductive path is periodic a constant second period length, the second period length being a second divisor of 360°.

12. The sensing element according to claim 11, wherein the first divisor is an even number, and the second divisor is an odd number.

13. The sensing element according to claim 1, wherein the first gap length is smaller than the second gap length, the course of the second receiving conductive path has a first amplitude within a first section and a second amplitude within a second section, the first section extending over a first angle starting from an end of the second receiving conductive path adjacent to the first gap, the second section extending over a second angle starting from another end of the second receiving conductive path adjacent to the second gap, each of the first angle and the second angle being less than or equal to half the second arc length, the first amplitude being smaller than the second amplitude.

14. The sensing element according to claim 13, wherein the course of the fourth receiving conductor path has a third amplitude within a third section and a fourth amplitude within a fourth section, the third section extending over a third angle starting from an end of the fourth receiving conductive path adjacent to the first gap, the fourth section extending over a fourth angle starting from another end of the fourth receiving conductive path adjacent to the second gap, each of the third angle and the fourth angle being less than or equal to half the fourth arc length, the third amplitude being smaller than the fourth amplitude.

15. The sensing element according to claim 1, wherein the course of the fourth receiving conductor path has a third amplitude within a third section and a fourth amplitude within a fourth section, the third section extending over a third angle starting from an end of the fourth receiving conductive path adjacent to the first gap, the fourth section extending over a fourth angle starting from another end of the fourth receiving conductive path adjacent to the second gap, each of the third angle and the fourth angle being less than or equal to half the fourth arc length, the third amplitude being smaller than the fourth amplitude.

16. The sensing element according to claim 1, wherein the second arc length and the fourth arc length are equal.

17. The sensing element according claim 1, wherein the second arc length and the fourth arc length are different lengths.

18. The sensing element according to claim 17, wherein the first gap length and the second gap length are equal.

19. The sensing element according to claim 17, wherein a first area spanned by the second receiving conductive path is as large as a second area spanned by the fourth receiving conductive path.

20. The sensing element according to claim 17, wherein the second arc length is greater than the fourth arc length, the course of the second receiving conductive path has a first amplitude, the course of the fourth receiving conductive path has a second amplitude, the first amplitude being smaller than the second amplitude.

21. The sensing element according to claim 1, wherein each of the detector units includes a respective excitation track.

* * * * *